Sept. 20, 1932.  L. H. KAUPKE  1,878,407
LISTER DRIVE
Filed Aug. 3, 1929

Witness:
Chas R Koursh

Inventor
Lee H. Kaupke,
Attys.

Patented Sept. 20, 1932

1,878,407

UNITED STATES PATENT OFFICE

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS

LISTER DRIVE

Application filed August 3, 1929. Serial No. 383,360.

This invention relates to improvements in listers, and more particularly to seed can drive connections for crank axle implements of the character described, and has for its principal object to provide an improved and simplified arrangement of chain tensioning device for automatically maintaining the drive connection from the ground wheel to the seed can in the various adjusted positions of said crank axles.

As heretofore constructed, listers have usually been provided with a seed can drive connection to the ground wheel including two connected sets of chains and chain sprockets, one set extending from the ground wheel to the axis of the crank axle, and swinging axially with the latter, and the other set extending from the axis of said crank arm to the seed can. In carrying out my invention I provide an improved and simplified drive mechanism including but a single drive chain, and with means for automatically maintaining its tension in all positions of the crank axles.

Figure 1:
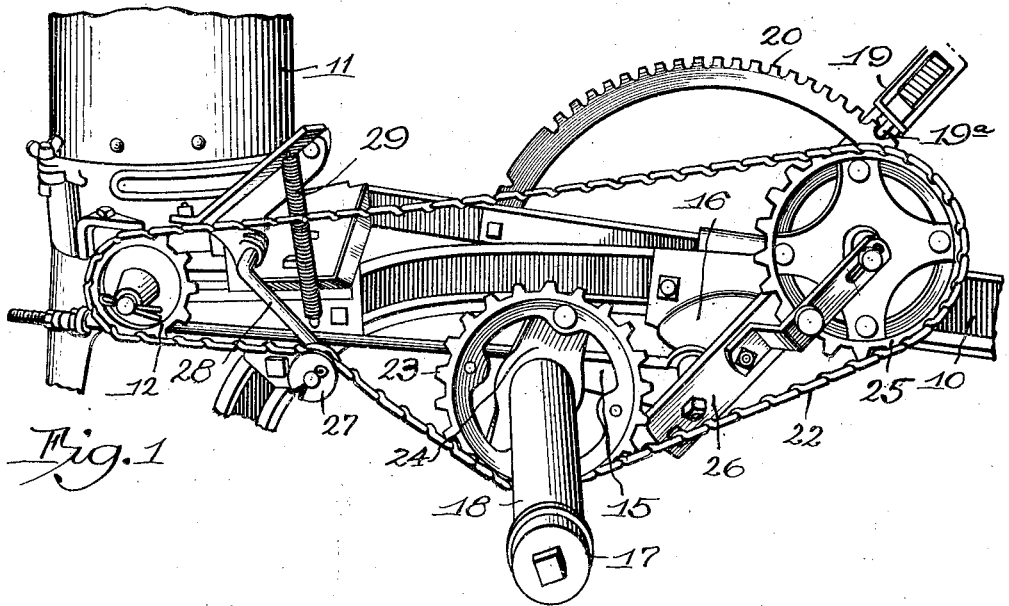

The invention may best be understood by reference to the accompanying drawing, in which Figure 1 is a perspective view showing portions of a lister frame and seeding mechanism, with the ground wheel removed from the crank axle, and with the crank axle in raised position.

Figure 2:
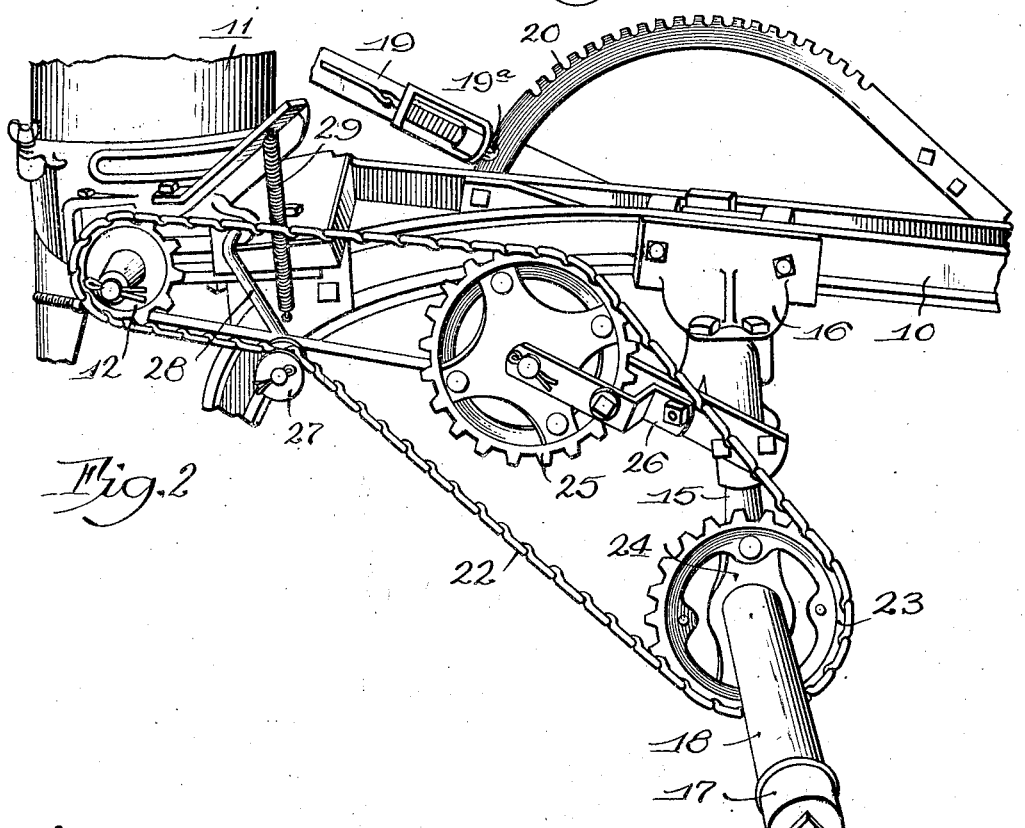

Figure 2 is a view similar to Figure 1, but with the crank axle in lowered position.

Referring to details of the drawing, only a portion of a lister frame is shown, including a lister beam 10, having a seed can 11 mounted on the rear end thereof in the usual manner. The seed can is provided with a drive sprocket 12 at one side thereof, suitably connected for operating the seed dropping mechanism, which may be of any usual construction and is not shown in detail herein as it forms no part of the present invention.

A crank axle 15 is rotatably mounted in a bracket 16 on the lister beam 10, and includes an offset axle part 17 on which the ground wheel is mounted. For convenience of illustration, only the bearing sleeve 18 is shown on the axle part 17, the remaining portions of the wheel being omitted. The crank axle is provided as usual with lifting means to control the depth of the lister, herein said lifting means comprising a hand lever 19 having a spring latch 19a adjustably engaging in a toothed segment 20, also rigid with the beam 10.

In the preferred form shown, the crank axle swings rearwardly, this arrangement being especially preferable in listers, as it enhances stability of the lister when in the ground, and ease of lifting control of the lister.

The drive sprocket 12 is driven direct from the ground wheel through a single chain 22 trained over a sprocket 23 rotatably mounted on the offset axle part 17, and rigidly connected to rotate with the ground wheel as by spider 24 connected to the latter.

Tension on the chain is maintained by an auxiliary sprocket 25, carried on a bracket 26 mounted on the crank axle and offset rearwardly therefrom when the latter is in lowered position as shown in Figure 2. The axis of the auxiliary sprocket 25 is arranged on a radial line extending substantially at a right angle to the crank arm, and approximately the same distance from the axis of the crank arm as the axis of the ground wheel. The arrangement is such that the chain 22 is continuously engaged with the three sprockets 12, 23 and 25, and the sprocket 25 takes up all slack in the chain as the crank arm is swung rearwardly toward the seed can, as shown in Figure 1, in which position the lister is in its lowermost position. Similarly, when the crank axle is depressed or swung pivotally forward and downward as in Figure 2, to elevate the lister, or in any intermediate position, the chain is automatically maintained in proper driving tension.

It may also be desirable to provide an idler pulley 27, which may be mounted on an arm 28 and maintained under tension by suitable means against the chain in the usual manner as for instance by coil spring 29. Such an idler serves to produce the desired initial tension on the chain, but of course is not sufficient of itself to maintain the tension in all positions of adjustment of the crank arms.

The novel form of drive connection above described may be employed on listers of the single or two-row type, in the latter type it being preferable to connect each of the seed cans for independent operation from its adjacent ground wheel.

Although I have illustrated and described one particular embodiment of my invention, it will be understood that I do not wish to be limited to the exact construction shown and described, but that various changes and modifications may be made without departing from the spirit and scope of my invention.

I claim as my invention:

1. In a lister, a frame, a seed can and drive means therefor mounted on the rear of said frame, a ground wheel crank axle having bearing in said frame, a sprocket and chain driving connection between said seed can and said crank axle including a single chain and an auxiliary idler carried on said crank axle in offset relation therewith to maintain the tension of said chain in the various adjusted positions of said crank axle.

2. In a lister, a frame, a seed can and drive means therefor mounted on the rear of said frame, a ground wheel crank axle having bearing in said frame, said axle and wheel being pivotally movable rearwardly and upwardly to lower said frame relative to the ground, a sprocket and chain driving connection between said seed can and said crank axle including a single chain and an auxiliary idler carried on said crank axle in offset relation therewith to maintain the tension of said chain in the various adjusted positions of said crank axle.

3. In a lister, a frame, a seed can and drive means therefor mounted on the rear of said frame, a ground wheel crank axle having bearing in said frame, said axle being pivotally movable rearwardly and upwardly to lower said frame relative to the ground, a sprocket and chain driving connection between said seed can and said crank axle including a single chain and an auxiliary idler carried on said crank axle and having its axis disposed in a radial line substantially at a right angle to said crank axle to maintain the tension of said chain in the various adjusted positions of said crank axle.

Signed at Rock Island, Ill., this 27th day of July, 1929.

LEE H. KAUPKE.